United States Patent [19]

Nakano

[11] Patent Number: 5,248,285
[45] Date of Patent: Sep. 28, 1993

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 922,782

[22] Filed: Jul. 31, 1992

[30] Foreign Application Priority Data

Aug. 1, 1991 [JP] Japan .................................. 3-214260

[51] Int. Cl.$^5$ .......................................... F16H 15/08
[52] U.S. Cl. .......................................... 476/15; 476/40
[58] Field of Search .................... 74/200; 475/216; 476/15, 40

[56] References Cited

U.S. PATENT DOCUMENTS

| 3,823,613 | 7/1974 | Abbott | 74/200 |
| 4,297,918 | 11/1981 | Perry | 74/200 |

FOREIGN PATENT DOCUMENTS

| 78007 | 4/1935 | France | 74/200 |
| 63-92859 | 6/1988 | Japan . | |
| 1-112076 | 4/1989 | Japan . | |
| 2-163553 | 6/1990 | Japan . | |
| 2-245565 | 10/1990 | Japan | 475/216 |
| 416663 | 10/1934 | United Kingdom | 74/200 |
| 2150240 | 6/1985 | United Kingdom | 74/216 |

Primary Examiner—Allan D. Herrmann
Assistant Examiner—David W. Laub
Attorney, Agent, or Firm—Foley & Lardner

[57] ABSTRACT

A continuously variable traction roller transmission comprises a transmission casing for housing traction roller transmission units and a forward/reverse change-over device, and a wall member detachably disposed therein between the traction roller transmission units and the forward/reverse change-over device.

3 Claims, 3 Drawing Sheets

CONTINUOUSLY VARIABLE TRACTION ROLLER TRANSMISSION

BACKGROUND OF THE INVENTION

I. Description of the Prior Art

The present invention relates generally to a continuously variable traction roller transmission, and more particularly, to a power train supporting structure thereof.

II. Field of the Invention

One of previously known power train supporting structures of a continuously variable traction roller transmission is disclosed, for example, in JP-A 2-163553. This prior art transmission includes generally two pairs of traction roller transmission units on a torque transmission shaft and a forward/reverse change-over device disposed in tandem to the traction roller transmission unit on the front side or engine side thereof, and is provided with a wall between the traction roller transmission units and the forward/reverse change-over device for separating and supporting the two.

When carrying out power transmission between input and output disks of each traction roller transmission unit through power rollers, this prior art transmission can steplessly change the speed ratio by varying the inclination angle of the power rollers.

With the known power train supporting structures of a continuously variable traction roller transmission as disclosed in JP-A 2-163553, however, since the torque transmission shaft on which generally the two pairs of traction roller transmission units are disposed has a great length, and a loading cam device is disposed at the front end thereof, the loading cam device and the input disk of one of the traction roller transmission units are adjacent to the wall for separating a space for the traction roller transmission units and a space for the forward/reverse change-over device. Accordingly, if the loading cam device, bearing thereof, input disk, etc. are subassembled on the torque transmission shaft, the restriction on a working space makes mounting very difficult. Practically, almost all parts of the traction roller transmission units to be mounted on the torque transmission shaft are located inside the transmission, necessitating ensuring the working space inside the transmission, resulting in an enlarged size thereof.

SUMMARY OF THE INVENTION

It is, therefore, an object of the present invention to provide a power train supporting structure of a continuously variable traction roller transmission which contributes to a reduction in size of the transmission.

According to the present invention, there is provided a continuously variable traction roller transmission, comprising:

traction roller transmission units;

a forward/reverse change-over device disposed adjacent to said traction roller transmission units;

a transmission casing disposed to house said traction roller transmission units and said forward/reverse change-over device; and a wall member detachably disposed in said transmission casing, said wall member being located between said traction roller transmission units and said forward/reverse change-over device.

DESCRIPTION OF PREFERRED EMBODIMENTS

Figure 1:
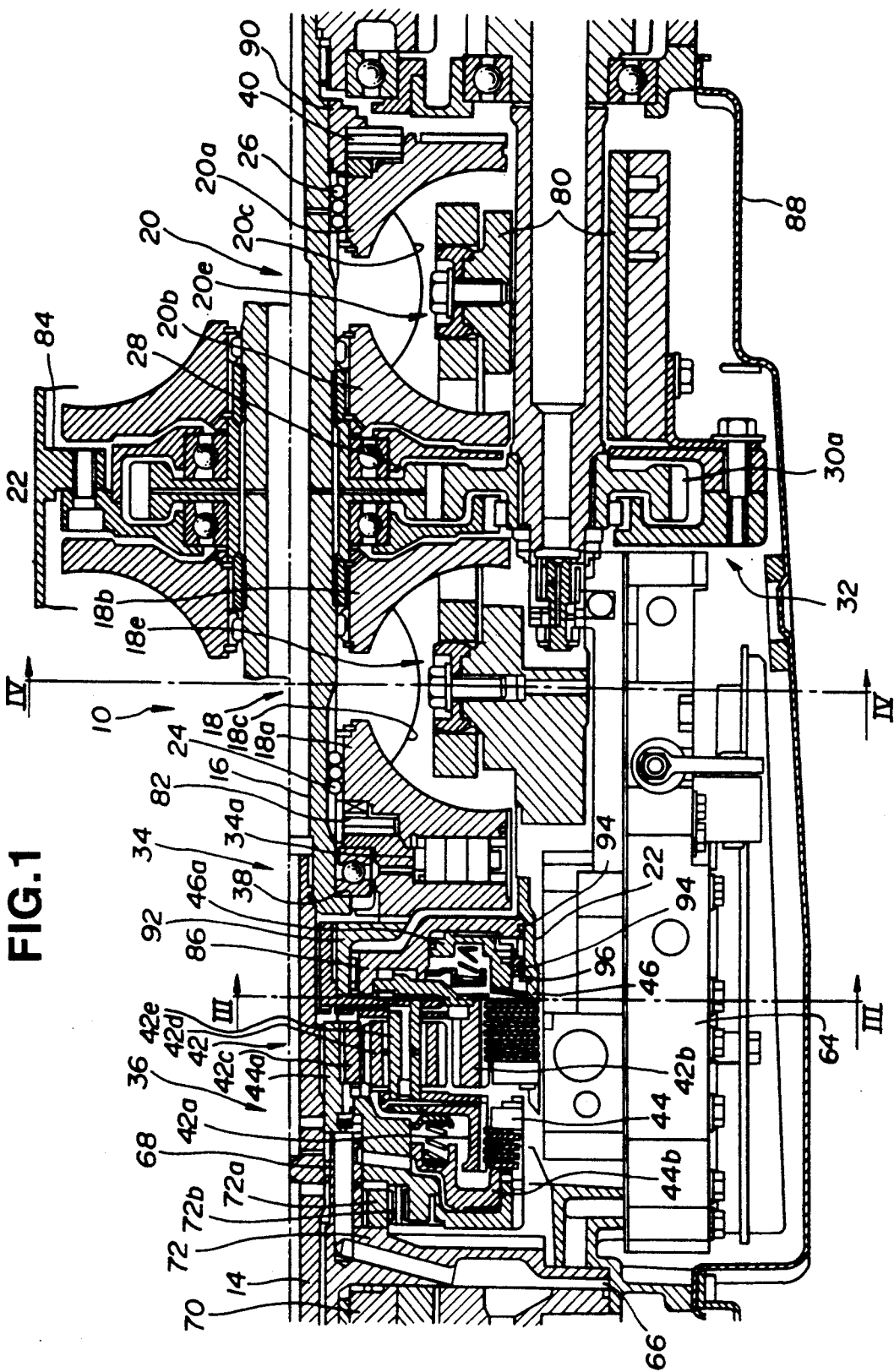
FIG. 1 is a longitudinal section showing a preferred embodiment of a power train supporting structure of a continuously variable traction roller transmission according to the present invention.

Referring to the drawings, a preferred embodiment of the present invention will be described. Referring first to FIG. 2, the entirety of a continuously variable traction roller transmission 10 will be described. The traction roller transmission 10 receives torque from an engine (not shown) through a torque converter 12 which is of the known type having a pump impeller 12a, a turbine runner 12b, a stator 12c, a lock-up clutch 12d, etc. An input shaft 14 is arranged to the torque converter 12 through the center portion thereof. A forward/reverse change-over device 36 (which will be described hereinafter in connection with FIG. 1) having a planetary gear set 42, a forward clutch 44, and a reverse brake 46 is arranged on the input shaft 14 on the right side of the torque converter 12.

The input shaft 14 has a right end supported on a torque transmission shaft or first shaft 16 arranged on the same axis. Arranged in tandem on the torque transmission shaft 16 are a first traction roller transmission unit 18 and a second traction roller transmission unit 20. The first traction roller transmission unit 18 comprises a pair of input and output disks 18a, 18b which have a toroidally shaped opposite surface, respectively, a pair of power rollers 18c, 18d which is in frictional contact with the opposite surface of the input and output disks 18a, 18b and is symmetrically disposed relative to the torque transmission shaft 16, a supporting mechanism (not shown) for rotatably supporting the power rollers 18c, 18d, and servo pistons 18e, 18f (see FIG. 1) which serve as a hydraulic actuator. Likewise, the second traction roller transmission unit 20 comprises a pair of input and output disks 20a, 20b which have a toroidally shaped opposite surface, respectively, a pair of power rollers 20c, 20d which is in frictional contact with the opposite surface of the input and output disks 20a, 20b and is symmetrically disposed relative to the torque transmission shaft 16, a supporting mechanism (not shown) for rotatably supporting the power rollers 20c, 20d, and servo pistons 20e, 20f (see FIG. 1) which serve as a hydraulic actuator. The first and second traction roller transmission units 18, 20 are disposed on the torque transmission shaft 16 so that the output disks 18b, 20b are opposite to each other. The input disk 18a of the first traction roller transmission unit 18 is biased axially rightward by a loading cam device 34 which produces pressing force in accordance with input torque from the torque converter 12, whereas the input disk 20a of the second traction roller transmission unit 20 is biased axially leftward by a disk spring 40. As disclosed in JP-U 63-92859, the power rollers 18c, 18d are rotated by the servo pistons 18e, 18f, 20e, 20f (which will be described hereinafter) which are operated under control pressure from a control valve 64 so as to obtain the inclination angle in accordance with a cruising condition of a vehicle, thus steplessly or continuously varying input torque of the input disks 18a, 20a to transmit same to the output disks 18b, 20b.

The output disks 18b, 20b are splined to an output gear 28 which is engaged with the torque transmission shaft 16 for relative rotation. Torque transmitted to the output disks 18b, 20b is in turn transmitted to a gear 30a connected to an output shaft or countershaft 30 as a second shaft through the output gear 28. These gears 28, 30a constitute a torque transmission mechanism 32. After the output shaft 30, the arrangement is constructed in accordance with a drive to be applied. In case of a four-wheel drive, for example, the arrangement provides a torque transmission mechanism 48 comprising a gear 52 disposed on the output shaft 30, a gear 54 disposed on an output shaft 50, and an idler gear 56 engaged with the gears 52, 54. The output shaft 50 is connected to a first propeller shaft 60, whereas the idler gear 56 is engaged with a distributor gear 58 to which a second propeller shaft 62 is connected. For details of the continuously variable traction roller transmission as shown in FIG. 2, see JP-A 2-163553 which discloses a continuously variable traction roller transmission similar to this.

Figure 2:
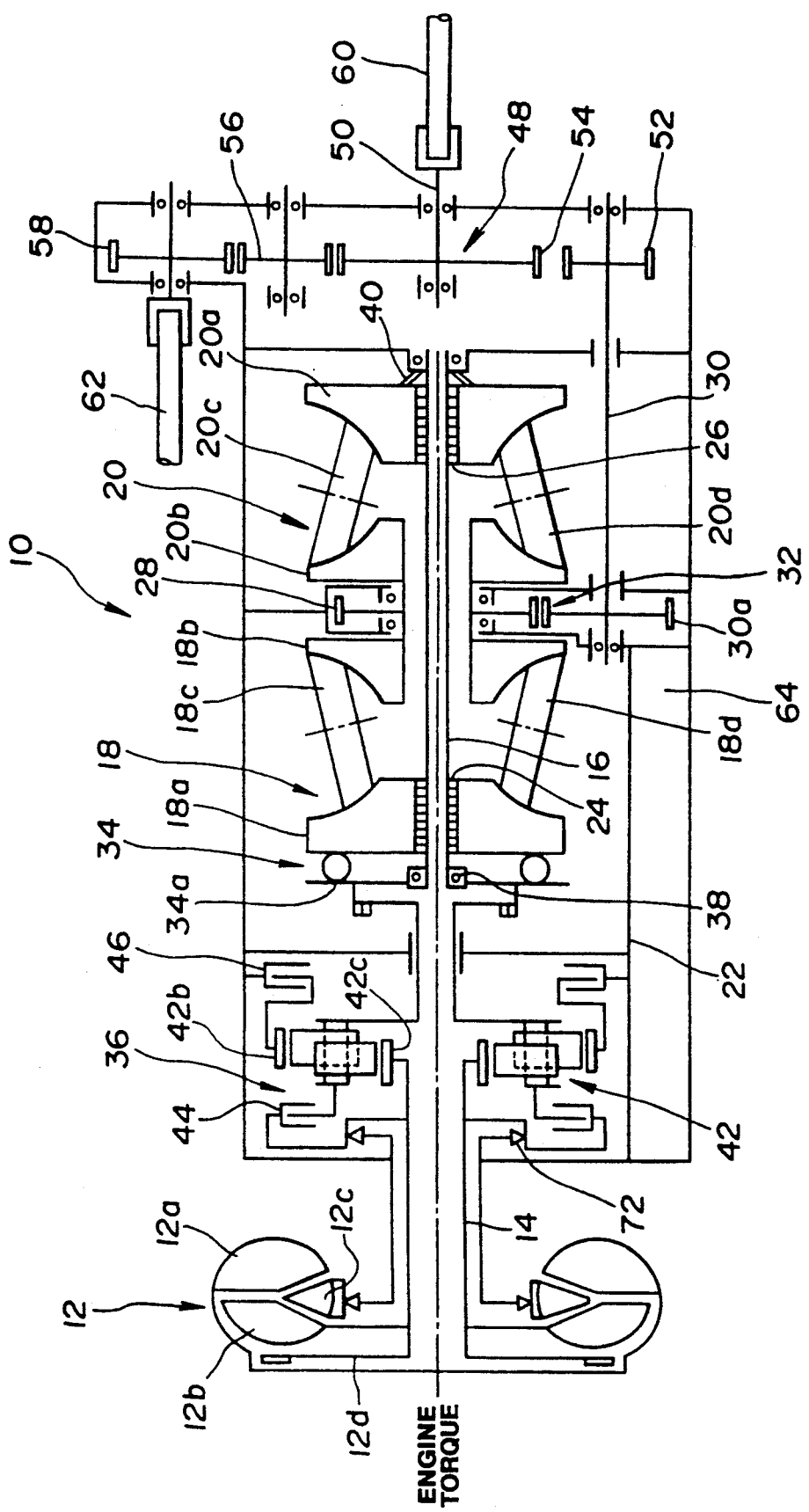
FIG. 2 is a skeleton diagram showing the continuously variable traction roller transmission in FIG. 1.

Referring next to FIG. 1, a power train supporting structure of a continuously variable traction roller transmission embodying the present invention will be described in detail. FIG. 1 shows a longitudinal section (half section) taken through an axis of the input shaft 14 and the torque transmission shaft 16 of FIG. 2 and omitting a part on the left side or engine side of the torque converter 12. The forward/reverse change-over device 36 disposed on the input shaft 14 comprises the planetary gear set 42, the forward clutch 44 capable of engaging a carrier 42a of the planetary gear set 42 with the input shaft 14, and the reverse brake 46 capable of fixing a ring gear 42b of the planetary gear set 42 to a transmission casing 22. A sun gear 42c of the planetary gear set 42 is splined to a clutch drum 44a on the outer periphery thereof which is in turn splined to the input shaft 14, whereas planetary gears 42d, 42e of the planetary gear set 42 are engaged with each other to form a double planetary gear. The forward/reverse change-over device 36 inputs torque in the same direction as the engine (refer hereinafter to as normal rotation) to the continuously variable traction roller transmission 10 by engaging the forward clutch 44 and releasing the reverse brake 46, whereas it inputs torque in the reverse direction as the engine (refer hereinafter to as reverse rotation) by releasing the forward clutch 44 and engaging the reverse clutch 46.

An oil pump cover 66 disposed proximate to the input shaft 14 on the outer periphery thereof, has a left end (not shown) splined to the torque converter 12, and a right end supported to the input shaft 14 through a bush 68. An oil pump 70 is engaged with the oil pump cover 66, and an inner race 72a of a hill-hold type one-way clutch 72 is splined thereto on the right thereof, whereas a roller 72b of the one-way clutch 72 is in contact with the clutch drum 44a on the inner periphery thereof which is engaged with the oil pump cover 66 at the right end of the inner periphery thereof to be concentric with a piston 44b. The one-way clutch 72 establishes a single direction of rotation of the input shaft 14 relative to the transmission casing 22, so that reverse rotation is not possible even if it is forced during normal rotation, having no reversing on a slope as a continuously variable transmission (belt type) as disclosed in JP-A 1-112076 has.

A loading cam 34a of the loading cam device 34 is engaged with the torque transmission shaft 16 for relative rotation, and is supported thereto through a thrust bearing 38. The input disk 18a with which the loading cam 34a is in contact, and the input disk 20a which is opposite thereto are rotatably and axially movably supported to the torque transmission shaft 16 through ball splines 24, 26, respectively. Accordingly, when the input shaft 18a undergoes axial pressing force generated by the loading cam device 34, the input 20a undergoes pressing force in the direction opposite to the above pressing force through the disk spring 40 on the torque transmission shaft 16, whereas when the input shaft 20a undergoes pressing force generated by the disk spring 40, the input disk 18a undergoes pressing force in the direction opposite to the above pressing force through the loading cam device 34 of the torque transmission shaft 16. Thus, it will be seen that when the input disk 18a is moved rightward on the torque transmission shaft 16, the input disk 20a is moved leftward thereon by the same amount.

A control valve 64 for supplying control pressure to the forward clutch 44 and the reverse brake 46 of the forward/reverse change-over device 36, and the power rollers 18c, 18d, 20c, 20d of the continuously variable traction roller transmission 10 is disposed to the forward/reverse change-over device 36 on the outer periphery thereof. Specifically, referring to FIG. 3, the transmission casing 22 has a space for forward/reverse change-over device cored in the axial direction (longitudinal direction in FIG. 1) to have a cylindrical form. The forward/reverse change-over device 36 is disposed inside the cylindrical form, whereas the control valve 64 is disposed outside (practically, below) the cylindrical form. Here, it is to be noted that the continuously variable traction roller transmission embodying the present invention is differently arranged to locate the forward/reverse change-over device 36 immediately after the torque converter 12 in the same manner as the continuously variable traction roller transmission of JP-A 2-163553. Thus, if a portion below the forward-/reverse change-over device 36 and the traction roller transmission units 18, 20 adjacent thereto serves as a space for control valve 64, the oil pump 70, torque converter 12, forward clutch 44, reverse brake 46, and servo pistons 18e, 18f, 20e, 20f to be connected to the control valve 64 through hydraulic passages can be arranged in the vicinity of the control valve 64 in ensuring a volume required by the control valve 64, obtaining the shortest hydraulic passages.

Figure 3:
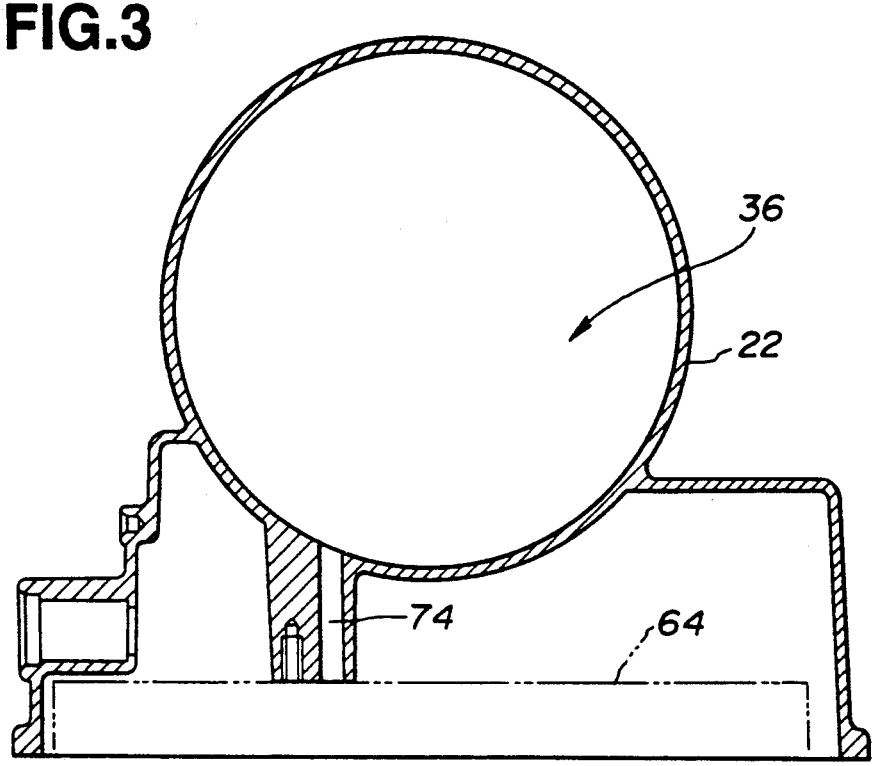
FIG. 3 is a cross section taken along line III—III of FIG. 1, showing a space for forward/reverse change-over device in a transmission casing.
Figure 4:
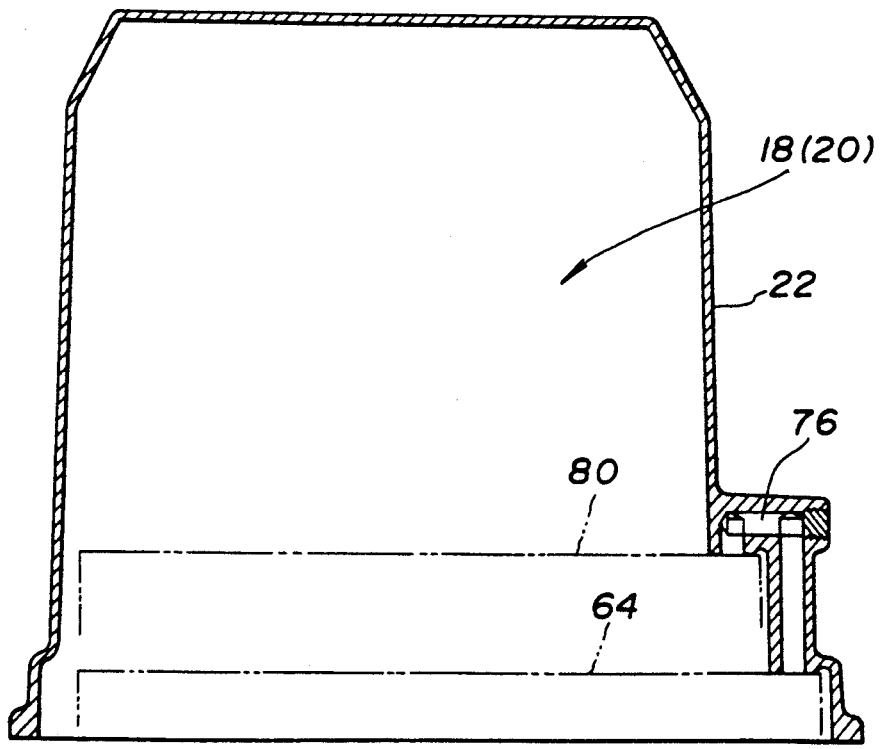
FIG. 4 is a view similar to FIG. 3, but taken along line IV—IV of FIG. 1, showing a space for traction roller transmission units in the transmission casing.

In the above case, a hydraulic passage 74 from the control valve 64 to the reverse brake 46 is disposed outside the cylindrical form of the transmission casing 22 as shown in FIG. 3. Likewise, a hydraulic passage to the forward clutch 44 is disposed outside the cylindrical form. Referring to FIG. 4, a hydraulic passage 76 from the control valve 64 to the servo pistons 18e, 18f of the first traction roller transmission unit 18 is disposed inside a space for traction roller transmission units in the transmission casing 22 which is cored in the axial direction (vertical direction in FIG. 1) to have a prismatic form. Control pressure is conducted from the hydraulic passage 76 to the servo pistons 18e, 18f through a servo piston body 80 of the laminated structure. A hydraulic passage from the control valve 64 to the servo pistons 20e, 20f of the traction roller transmission unit 20 is disposed inside the prismatic form as shown in FIG. 4 in arranging to the transmission casing 22 a hydraulic passage parallel to the axis.

A power train is mounted as follows: First, as shown in FIG. 1, the loading cam device 34, input disk 18a, disk spring 82, thrust bearing 38, ball spline 24, etc. are subassembled to the torque transmission shaft 16 at the front end thereof or on the side of the forward/reverse change-over device 36, whereas a subassembly of the output disks 18b, 20b, gear 28, bearing, etc. is supported by a wall member 84 mounted to the transmission casing 22. At that moment, an annular wall 86 for separating the space for forward/reverse change-over device and the space for traction roller transmission units and supporting or centering the forward/reverse change-over device 36 and the traction roller transmission units 18, 20 is removed to form an opening on the side of the forward/reverse change-over device 36.

When the torque transmission shaft 16 subassembled as described above is inserted axially rightward as viewed in FIG. 1 from this opening, it is arranged through the subassembly of the output disks 18b, 20b, etc. After this, the ball spline 26 is engaged with the torque transmission shaft 16, and the input disk 20a is put inside the prismatic form from a lower side or oil pan 88 side opening so as to engage with the torque transmission shaft 16. Subsequently, a trunnion (not shown) having the power rollers 18c, 18d, 20c, 20d subassembled are inserted from the bottom so that the power rollers 18c, 18d, 20c, 20d are in contact with the input and output disks 18a, 18b, 20a, 20b, respectively. The disk spring 40 and a nut 90 for supporting the same are inserted from the right as viewed in FIG. 1, and then the nut 90 is tightened, completing mounting of the traction roller transmission units 18, 20 on the torque transmission shaft 16. It is to be noted that the servo pistons 18e, 18f, 20e, 20f subassembled to the servo piston body 80 are then inserted in the trunnion from the bottom to mount thereto.

Next, the wall 86 and a sleeve 92 engaged with the inner periphery thereof are inserted in the transmission casing 22 and fixed thereto by a snap ring 96 in carrying out sealing by an O-ring 94, then a piston 46a of the reverse brake 46 is interposed between the transmission casing 22 and the wall 86. Thus, the wall 86 is detachable, with prevention of pressure leakage by the O-ring 94. Subsequently, the right end of the input shaft 14 having the forward/reverse change-over device 36 subassembled is fitted in and fixed to the torque transmission shaft 16, and finally, mounting of the control valve 64, etc. is carried out. It is to be noted that since the entirety of the forward/reverse change-over device 36 is constructed in a unit manner, only the input shaft 14 may be fitted therein afterward.

With the mounting method as described above, since the torque transmission shaft 16 is inserted from the opening on the side of the forward/reverse change-over device 36, working space is not needed in the space for traction roller transmission units in the transmission casing 22, resulting in a reduced size of the continuously variable traction roller transmission in the axial and radial directions thereof, and a shortened length of the torque transmission shaft 16. Moreover, the only mounting work to be done in the space for the traction roller transmission units is the tightening of the nut 90, represents a large reduction in mounting work that is required in this area as compared with that of the prior art transmission of JP-A 2-163553, resulting in a great improvement in mounting efficiency and accuracy.

What is claimed is:

1. A continuously variable traction roller transmission, comprising:
   traction roller transmission units;
   a forward/reverse change-over device disposed adjacent to said traction roller transmission units;
   a transmission casing which houses said traction roller transmission units and said forward/reverse change-over device; and
   a wall member detachably disposed in said transmission casing for supporting said traction roller transmission units and said forward/reverse change-over device, said wall member being located between said traction roller transmission units and said forward/reverse change-over device.

2. A continuously variable traction roller transmission as recited in claim 1, wherein said wall member is a non-rotatable wall member.

3. A method for assembling a continuous variable transmission having a casing, a transmission shaft, an input shaft, and first and second opposing ends relative to a longitudinal axis of the transmission, said method comprising the steps of:
   a) mounting a sub-assembly of output disks to a first wall member which is fixed to said casing;
   b) installing a sub-assembly of a loading cam on a transmission shaft;
   c) inserting said transmission shaft with said loading cam sub-assembly installed thereon through said first end of said transmission;
   d) mounting a wall member to said casing in a detachable manner;
   e) fixing an input shaft having a sub-assembly of a forward/reverse changeover device to said transmission shaft by passing said input shaft through said first end; and
   f) supporting said change-over device sub-assembly and said output disk sub-assembly with said wall member.

* * * * *